Nov. 25, 1924.                                              1,516,911
W. CANFIELD ET AL
REENFORCING SLEEVE FOR ROTARY DRILL PIPE
Filed June 13, 1923

INVENTORS
Wallace Canfield
Paul Robert George Biedermann
BY
Booth & Booth
ATTORNEYS.

Patented Nov. 25, 1924.

1,516,911

UNITED STATES PATENT OFFICE.

WALLACE CANFIELD AND PAUL ROBERT GEORGE BIEDERMANN, OF TAFT, CALIFORNIA.

REENFORCING SLEEVE FOR ROTARY DRILL PIPE.

Application filed June 13, 1923. Serial No. 645,141.

*To all whom it may concern:*

Be it known that we, WALLACE CANFIELD and PAUL ROBERT GEORGE BIEDERMANN, citizens of the United States, residing at Taft, in the county of Kern and State of California, have invented certain new and useful Improvements in Reenforcing Sleeves for Rotary Drill Pipe, of which the following is a specification.

Our invention relates to rotary drill pipe comprising a plurality of sections coupled together and used in supporting and rotating the drill in the art of well boring. The object of our invention is to prevent what is termed twist-offs on the drill pipe. These usually occur at the first or second thread of the coupling joint adjacent to the end of the upset, that is, where the pipe section and the coupling mutually shoulder. It is obvious that when upsetting the pipe, especially by what is called the bulldozing process, which implies rather forcible action, the fibres of the steel are distorted, resulting in a weakening of the pipe at the junction of the upset and pipe. Also, the heavy, uneven vibrations throughout the drill pipe, when drilling through hard and mixed formations, result in crystallization of the pipe at the upset, and consequent twist-offs. We seek to prevent such twist-offs, by a reinforcement of the pipe specifically applied, and to this end our invention consists in the novel reenforcing sleeve which we shall now fully describe, by reference to the accompanying drawings in which Fig. 1 is a view of one section, broken, of our reinforced drill pipe, one half being in elevation and other in section.

Figure 1:
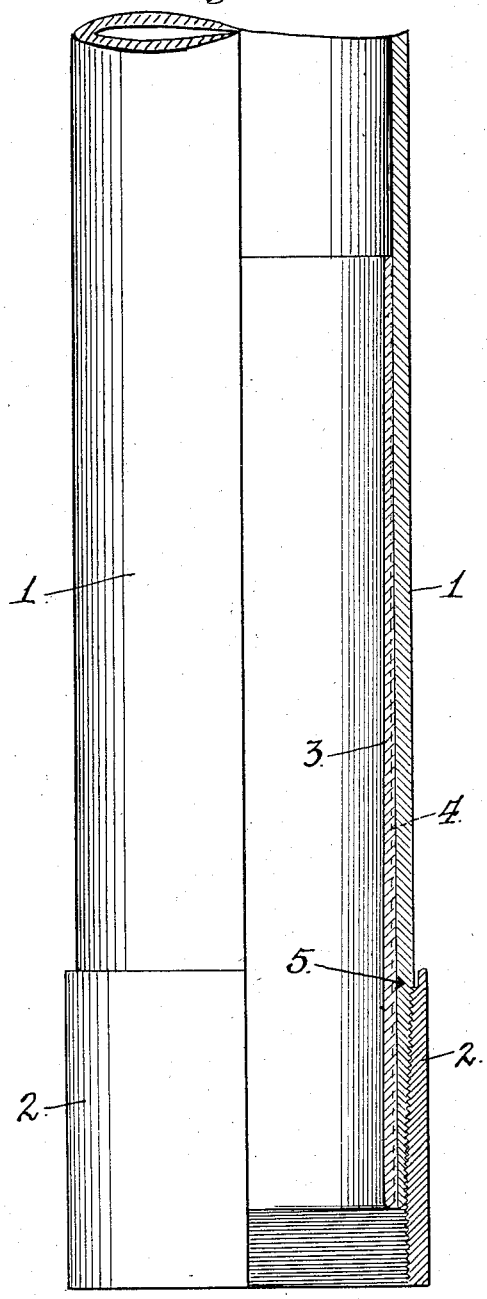
Figure 2:
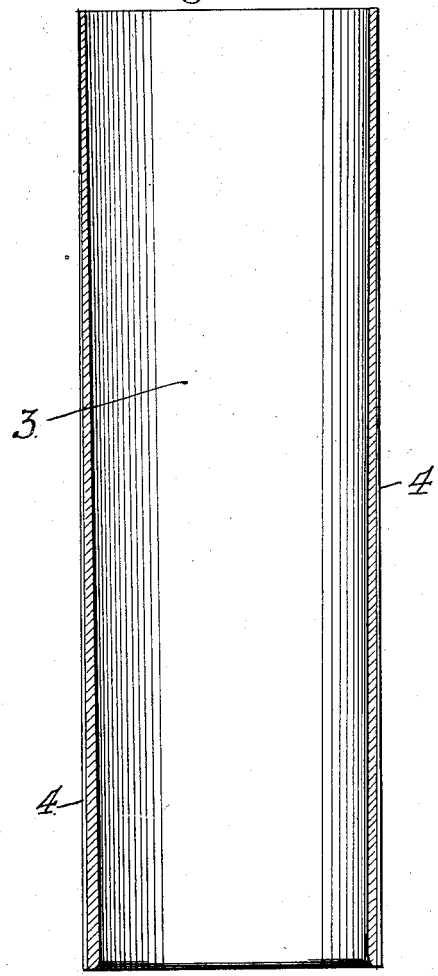
Fig. 2 is a longitudinal section of the reenforcing sleeve, on the line 2—2 of Fig. 3.
Figure 3:
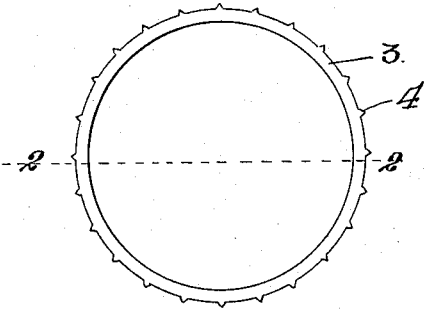
Fig. 3 is an end view of said sleeve.
Figure 4:
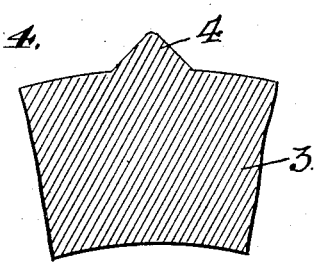
Fig. 4 is a detail, enlarged, showing the shape of the longitudinal ribs on the reenforcing sleeve.

Referring to Fig. 1, the numeral 1 indicates a portion of one section of the drill pipe, and 2 is the coupling threaded upon one end of said section and by which the section is united to a succeeding section. 3 is the reenforcing sleeve. This sleeve, in practice, is preferably made of 25 to 30 per cent carbonsteel about 18 to 24 inches long. It tapers from say ¼ inch thickness at one end to say ⅛ inch thickness at the other end; and exteriorly it is formed or fitted with longitudinal ribs 4 protruding a distance of about $\frac{3}{64}$ of an inch at the thicker end of the sleeve, and thence gradually vanishing towards the other end, said ribs being spaced approximately 15 degrees apart. The ribs 4 are substantially triangular in section as seen in Fig. 4.

The sleeve 3 is fitted to the interior of the pipe 1 with its thicker end coincident with the end of the pipe. It is shrunk into the pipe under pressure, after the pipe has been heated, the consequent contraction caused by the cooling resulting in a very tight joint, making the sleeve an integral part of the pipe. In Fig. 1, we have indicated at 5 the point of upset, where the pipe and coupling shoulder, which point is where the maximum vibrations are, and where the majority of twist-offs occur at the first or second threads. With the reinforcement as herein disclosed it is unnecessary to upset the drill pipe at the end, thus avoiding all distortion of the steel. This reinforcement materially adds to the strength of the drill pipe. It will reduce crystallization at the end of the thread on the pipe, by distributing vibrations over considerably more metal, thus minimizing twist-offs. It will reduce vibration by reason of the sleeve being tapered towards the inner wall of the pipe, thus picking up vibration at the end of the pipe and gradually reducing it towards the inner end, then allowing it to be borne by the pipe. It will, by means of the longitudinal ribs 4 on the exterior of the sleeve, enable the drill pipe to withstand heavier torsional stresses. It will make it possible to reclaim old drill pipe which has twisted off at end, without upsetting said end. Finally, it will lower the cost of drilling by minimizing twist-offs due to crystallization and will save in wear and tear on machinery by reducing vibration.

We claim:—

1. A reinforcement for coupled sections of drill pipe, comprising a pipe section; a threaded coupling exteriorly screwed upon the end of said section; and a sleeve tightly fitted within the coupled end of the pipe section and extending within the pipe beyond the cross plane of the coupling end, said sleeve on its outside being cylindrical and on its inside tapering away from the pipe end.

2. A reinforcement for coupled sections of drill pipe comprising a pipe section; a threaded coupling exteriorly screwed upon the end of said section; and a sleeve tightly fitted within the coupled end of the pipe section and extending within the pipe beyond the cross plane of the coupling end, said sleeve on its outside being cylindrical and tapering on its inner surface away from the pipe end, and having on its outer surface an annular series of longitudinally directed ribs.

3. A reinforcement for coupled sections of drill pipe, comprising a pipe section; a threaded coupling exteriorly screwed upon the end of said section; and a sleeve tightly fitted within the coupled end of the pipe section and extending within the pipe beyond the cross plane of the coupling end, said sleeve on its outside being cylindrical and tapering on its inner surface away from the pipe end, and having on its outer surface an annular series of longitudinally directed ribs, the ribs gradually reducing in height from the end of the sleeve at the coupled end of the pipe to the inner end of said sleeve.

In testimony whereof we have signed our names to this specification.

WALLACE CANFIELD.
PAUL ROBERT GEORGE BIEDERMANN.